US012359496B2

(12) United States Patent
Vianello et al.

(10) Patent No.: US 12,359,496 B2
(45) Date of Patent: Jul. 15, 2025

(54) METHOD AND DEVICE FOR MANUFACTURING AND APPLYING A RIGID SPACER FRAME TO AN INSULATING GLASS

(71) Applicant: FOREL S.P.A., Roncade (IT)

(72) Inventors: Fortunato Vianello, Roncade (IT); Riccardo Vianello, Roncade (IT)

(73) Assignee: FOREL S.P.A., Roncade (IT)

( * ) Notice: Subject to any disclaimer, the term of this patent is extended or adjusted under 35 U.S.C. 154(b) by 0 days.

(21) Appl. No.: 17/761,745

(22) PCT Filed: Sep. 22, 2020

(86) PCT No.: PCT/IB2020/058829
§ 371 (c)(1),
(2) Date: Mar. 18, 2022

(87) PCT Pub. No.: WO2021/059123
PCT Pub. Date: Apr. 1, 2021

(65) Prior Publication Data

US 2022/0372813 A1 Nov. 24, 2022

(30) Foreign Application Priority Data

Sep. 26, 2019 (IT) ........................ 102019000017270

(51) Int. Cl.
*E06B 3/673* (2006.01)
*B25B 11/02* (2006.01)
*B25H 1/18* (2006.01)

(52) U.S. Cl.
CPC .......... *E06B 3/67308* (2013.01); *B25B 11/02* (2013.01); *E06B 3/67321* (2013.01);
(Continued)

(58) Field of Classification Search
CPC . B25B 11/02; E06B 3/67308; E06B 3/67326; E06B 3/67365; E06B 3/67369; E06B 3/67373; B25H 1/18
See application file for complete search history.

(56) References Cited

U.S. PATENT DOCUMENTS 4,861,008 A * 8/1989 Steele .................. B25B 11/005 269/21
2011/0303349 A1 * 12/2011 Nieminen ........... E06B 3/66323 156/107
2012/0047708 A1 * 3/2012 Briese ..................... E06B 3/673 29/700

FOREIGN PATENT DOCUMENTS

KR 200315404 Y1 * 6/2003
KR 2020090007178 U 7/2009
WO 2017115063 A1 7/2017

OTHER PUBLICATIONS

Translation of KR-200315404-Y1 (Year: 2003).*
International Search Report for corresponding application PCT/IB2020/058829 filed Sep. 22, 2020; Mail date Nov. 2, 2020.

* cited by examiner

*Primary Examiner* — Matthew P Travers
(74) *Attorney, Agent, or Firm* — CANTOR COLBURN LLP

(57) ABSTRACT

The present invention deals with integrating methods for manufacturing and applying a spacer frame to a glass plate, particularly in the circumstance of increased sizes thereof, of the rigid type, i.e. which profiles essentially are formed by a hollow body having cross section close to the rectangular, micro-perforated in the wall facing the chamber of the insulating glass, where at least the wall facing the outer cavity intended for the secondary sealant is made of solid metal material or with a metal liner, the remaining walls or all the walls being capable of being made of plastic or metal,
(Continued)

e.g. aluminum or stainless steel. Certain innovative elements of the devices implementing such methods are also claimed.

18 Claims, 11 Drawing Sheets

(52) U.S. Cl.
CPC ...... *E06B 3/67326* (2013.01); *E06B 3/67365* (2013.01); *E06B 3/67373* (2013.01); *B25H 1/18* (2013.01); *E06B 3/67369* (2013.01)

METHOD AND DEVICE FOR MANUFACTURING AND APPLYING A RIGID SPACER FRAME TO AN INSULATING GLASS

FIELD OF APPLICATION

The field of application is the one set forth in the preamble to claim 1 of method, and to claim 6 of device.

BACKGROUND ART AND INHERENT PROBLEMS

It is known nowadays to resort to various solutions for making the spacer frame forming the element for defining the width of the chamber or of the chambers of insulating glass.

The most "conventional" and still current one consists of a rigid hollow profile frame provided with microholes in the wall facing the chamber (which we refer to as intrados), which is filled with hygroscopic material to absorb, through such microholes, the moisture initially contained and then penetrated in the chamber or in the chambers and then spread in the sides thereof, which are intended to be joined with the glass plates by a primary sealant, such a frame normally being manually applied against the face of the glass plate; the more "evolved" ones consist either of a profile, generally provided on reels, made of flexible expanded synthetic material integrating the hygroscopic material, which is pre-coated, on the sides thereof intended for joining with the glass plates, with acrylic adhesive and possibly primary sealant, such a profile being manually or automatically applied against the face of the glass plate in position close to the periphery; or of a thermoplastic or elastoplastic profile integrating the hygroscopic material, which mass normally is provided in barrels, such a profile being automatically extruded against the face of the glass plate.

The two families of "evolved" solutions appear to have the upper hand for the following reasons:

- reduced heat bridge with respect to the rigid frame solution;
- complete automation of the application or extrusion method against the face of the glass plate;
- positioning accuracy because it is obtained through mechatronic components in synchronous axes implemented by synchronous motors having increased resolution;
- independence from the sizes of the insulating glass, which nowadays may reach extreme values, currently also of 18 m of base by 3.5 m in height (the so-called Superjumbo sizes, the Jumbo sizes, also considerable, and even more frequent being 6 m of base by 3.3 m in height); base and height here refer to the position of the glass plates in the insulating glass production line;
- furthermore, in the second case of thermoplastic/elastoplastic profile, there is no need to have a range of widths of profiles in the warehouse because the extrusion occurs by selecting the width of the profile by means of adjusting the nozzle shield obtained through electric feedback actuator.

However, the one defined as the "conventional" solution nowadays has returned to the top, frequently replacing the more "evolved" solutions, for the following reasons:

- important effectiveness and durability of the bond between the (always metal) extrados of the frame and the secondary sealant, moreover without limitations in the choice of the same sealant, and therefore the stability of the frame itself because it is consistently restrained to the faces of the glass plates by means of such a sealant, a basic aspect in consideration of the mechanical, thermal and chemical stresses to which the insulating glass is subjected (particularly, the peripheral edge thereof) during the life thereof, especially in the so-called structural installations because they take on the functions of walls located atop skyscrapers, a life which for a marketing strategy may not be limited to the usual 10 years typical of construction, rather is required to be equal to at least 50 years;
- important barrier against the entry of moisture and towards the escape of gases, the extrados of the frame always being made of metal material, i.e. inorganic against the vulnerability of the frames related to the "evolved" solutions, the related materials always being organic, with at most pulverized aluminum in the extrados with the nanotechnology solutions, but which thickness does not reach 10 μm, and therefore results in permeability to gases and vapor;
- stability over time of the optical aspect of the side perimeter of the insulating glass because there is no need for photosensitive adhesives, as is the case of elastic spacers;
- wide range of solutions for the aspect of the intrados, which is visible from the inside of the insulating glass, especially with reference to the color, roughness and uniformity with the appearances of the frame;
- local mechanical resistance of the intrados of the frame, to the degree of being a valid mechanical anchor for the accessories installed in the chamber such as, for example the so-called "glazing bars" (known interior profiles which mainly simulate the division of the chamber into several chambers) and the so-called "Venetians" (darkening blinds) and relative fastening components and the maneuvers involving orientating, raising, lowering.

Unfortunately, although such a "conventional" solution is refined for many configurations while also making use of the most up-to-date techniques of the prior art, including certain semi-automatisms, it has the following drawbacks, especially when the sizes of the frame are considerable, as in the case of Superjumbo or Jumbo insulating glass, but also starting from side sizes much greater than 3 m:

- mainly the excessive employment of labor—even only in reference to the Jumbo sizes—4 or 5 operators being required in the frame laying station alone;
- again, mainly the inaccurate relative frame-glass plate positioning being the application operation entrusted to the ability of the operators, moreover an operation penalized by the inconvenient access to the whole periphery of the glass plate because it occurs under non-ergonomic conditions;
- again, mainly the risk of injuries, the positioning of the frame on the glass plate with slightly tilted position (generally by 6°) with respect to the vertical plane—which is the main case in the process on the insulating glass production lines—being assisted by unsafe means such as ladders and platforms which are to cover the overhang towards the glass plate up to the upper area;
- moreover, the movement of the frame, starting from the profiles forming it during the manufacturing process thereof, is problematic due to the non-rigidity of the components thereof, the presence of the hygroscopic material in the cavities and the presence of the sticky primary sealant on the sides thereof;

and as an overall consequence, reduced productivity of the whole insulating glass production line, the laying station of the spacer frame forming a particularly serious bottleneck in the process.

The most relevant prior art consists of Italian title 1093371, with application dated 16 Mar. 1978 and Applicant Karl Lenhardt, a known industrial pioneer in the field of machines for producing insulating glass. The related teaching is limited to overturning the spacer frame from a horizontal position feeding station to the one which is slightly tilted with respect to the vertical plane typical of the insulating glass production line.

Despite a period of forty years having transpired, nothing similar and better has been implemented to date, and the parallel title GB 2 114 639, with Application dated Mar. 12, 1982 and also known industrial pioneer Applicant Peter Lisec, a title hereinafter commented on, did not resolve the problem disclosed either, the installations carried out according to such a teaching—like the preceding case—no longer being used, in addition to not dealing with the field of the Jumbo sizes, let alone the Superjumbo sizes. This is a system for conveying the entirely prefabricated spacer frame through conveyors arranged with inclination joined with the one of the insulating glass production line and opposed thereto and conveying thereto by means of transverse movement; the possibility is mentioned, but not described, of causing the frame to automatically arrive prefabricated at said system, however indicating manual loading as prevailing.

However, all such prior art starts from the condition of spacer frame already formed, filled with hygroscopic material and coated on the sides thereof with primary sealant, such a habit resulting from the fact that the sizes of the frames—certainly not of the Jumbo or Superjumbo type—at the time of such prior art were considered large sizes starting from a base of 2 m, and therefore the non-large spacer frames, which constituted the majority, could be easily manually moved from the multiple machines for forming, filling with hygroscopic material, adding accessories and coating with the primary sealant, to the device set forth in such a prior art, for the application to the glass plate, the latter stopping in the production line station of the insulating glass dedicated to receiving the spacer frame in slightly tilted position with respect to the vertical plane, a classical circumstance of insulating glass production lines. In other words, the spacer frames were easy to move at the time the oldest inventions described were conceived and also later.

The present invention deals with the integration of the manufacturing and application methods of the above-defined “conventional” spacer frame to the glass plate, particularly in the circumstance of the increased sizes of the frame itself, and solves the problems of the prior art described in the paragraphs above. Certain innovative elements of the devices implementing the methods are also claimed.

An interesting advantage is that the conceived system allows the insulating glass production line to operate uninterruptedly according to the methods already underway for the cases of the spacer frames (both “conventional” and “evolved”) which manageable sizes allow the related movement and application, while later, the method and the device the object of the present Application proceed to manufacture the large spacer frame (Superjumbo, Jumbo or in any case unmanageable sizes) without interferences with said line, moreover in ergonomic position with regard to the manufacturing because in horizontal position, or slightly tilted position with respect to the horizontal plane for the introduction step of the hygroscopic material (when carried out in such a device) into the cavities of the profiles forming the components of the frame, and adequate automatisms or semi-automatisms or servomechanisms transfer the spacer frame and apply it to the glass plate in the frame laying line station only after the completion thereof.

DESCRIPTION OF THE INVENTION

The brief description of the drawings and the detailed description of a method for making the invention clarify how the invention the object of the present Application may be implemented.

DESCRIPTION OF THE DRAWINGS

FIGS. 1A, 1B, 1C and 1D show the “conventional” rigid spacer frame 3 the object of the present invention, formed by a hollow aluminum or stainless steel profile or a combined stainless steel/plastic profile, which is micro-perforated in the intrados, and filled with hygroscopic material 4, while FIGS. 1E, 1F show the so-called “evolved” solutions in which the spacer frames are formed by means of progressive application, which this invention does not deal with.

Figure 1:
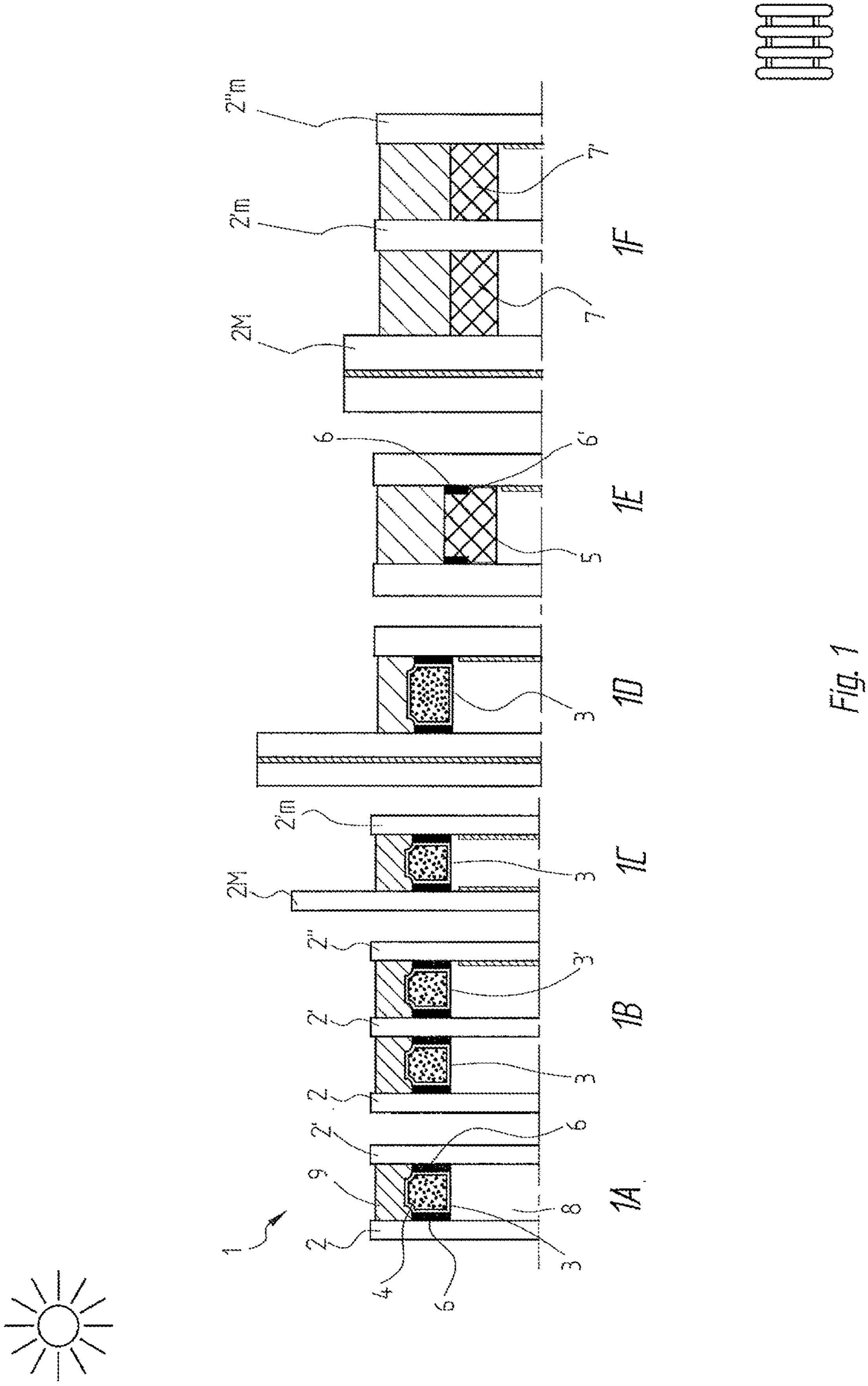
FIG. 1 diagrammatically shows the peripheral portion of the insulating glass 1 in a non-exhaustive exemplifying series of possible combinations: 1A normal; 1B triple glass with indoor glass with low emissivity coating; 1C outdoor glass with selective coating and offset with respect to the indoor glass with low emissivity coating; 1D laminated outdoor glass (which is called shielded glass if more than two glass plates form it) and offset with respect to the indoor glass with low emissivity coating; 1E tempered outdoor glass, indoor glass with low emissivity coating and profile spacer frame 5 made of flexible expanded plastic material; 1F triple glass, the outside laminated, offset with respect to the remaining two glass items, of which the indoor one with low emissivity coating and spacer frames made of thermoplastic or elastoplastic profile 7.

The two types of sealant employed are noted in cross section: against a black background, the butyl sealant 6 serving the function of initial bond between the sealing components (first sealing and primary sealant), in the case of flexible expanded plastic material frame 5, an acrylic adhesive 6' is used in place thereof (only indicated but not shown because having thickness of a few μm) or the combination both of the acrylic sealant 6' and the butyl sealant 6 applied between the receptacles of the side surfaces of the frame and the glass, as shown in FIG. 1E; with a thick dashed line, the polysulfide 9 (PS) or polyurethane (PU) or silicone (SI) sealant serving the function of mechanical constraint to the edge and of seal (second sealing and secondary sealant), applied between the extrados of the frame and the faces of the glass plates up to the edge of the glass plates or of the glass plate 2'*m*, having smaller sizes (in the common case of glass plates offset over some or all the sides). As shown in the above-described Figures, some cases use particularly heavy glass plates both due to thicknesses (laminated and tempered glass) and particularly to resist to the most sizeable environmental stresses due to the large sizes (currently certain architectural works even require sizes of insulating glass in one piece alone of 18 m×3.5 m), for which cases the present invention is of essential significance, the entirely prefabricated spacer frame of the “conventional” type therefore having to reach the same increased sizes, the prevailing positioning thereof being localized with the extrados at a distance p with respect to the margin of the glass plates at about 4-10 mm, a distance to be increased by the dimension relating to the offset (FIGS. 1C, 1D).

The indoor/outdoor orientation is visually identified with icons showing the sun (outdoor side) and the radiator (indoor side).

Figure 2B:
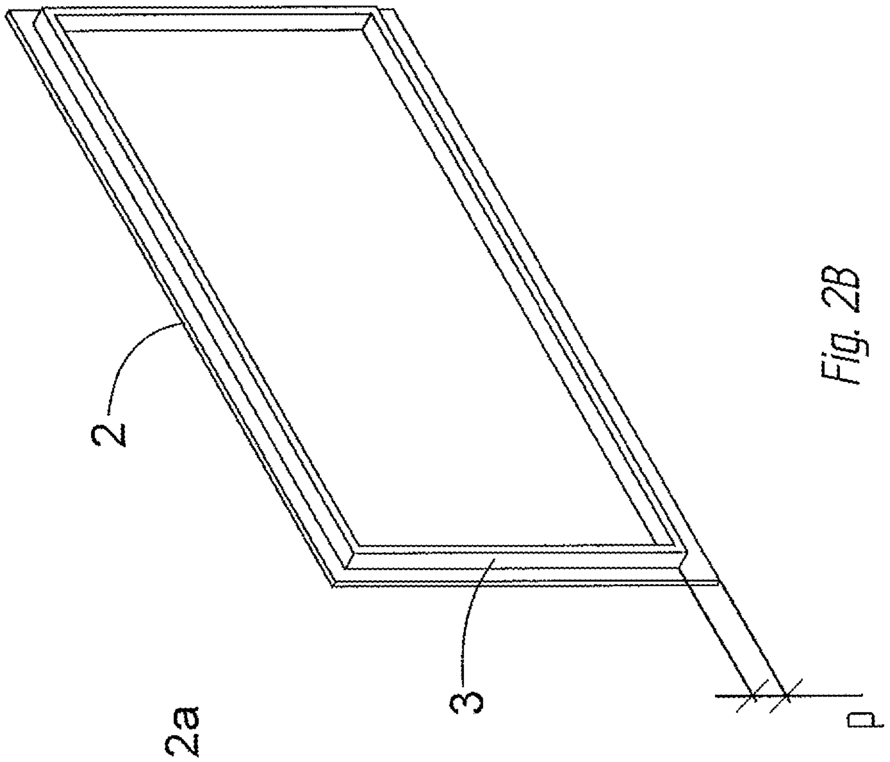
Figure 2A:
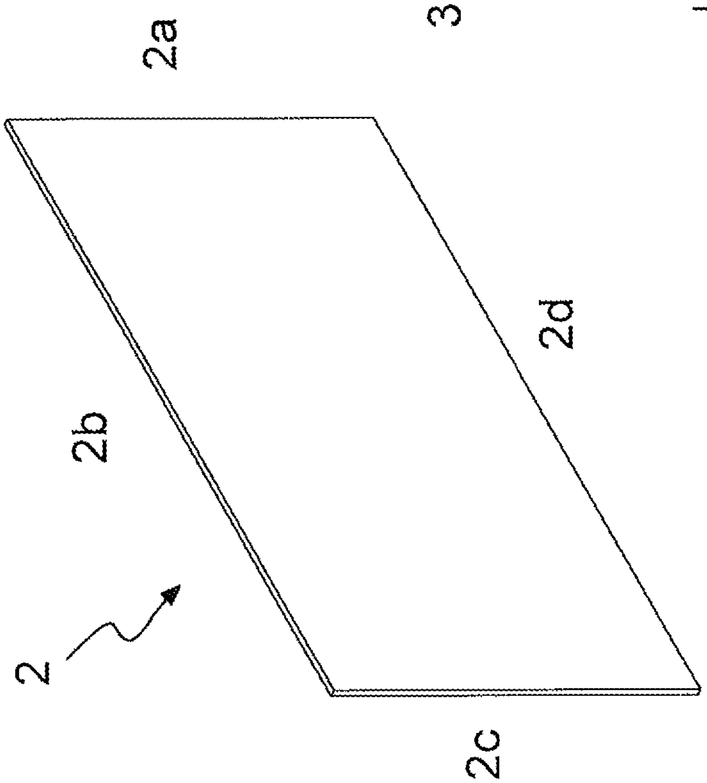

FIG. 2A shows the glass plate 2 (which can be extrapolated at 2', 2", 2M, 2'*m* and 2"*m*) with the identification of the individual sides by considering the displacement of the plate along the insulating glass production line from left to right: 2*a* front (or glass head), 2*b* upper; 2*c* rear (or glass tail), 2*d* lower.

FIG. 2B shows the glass plate 2 with the spacer frame of type 3 applied, as the final result of the present invention. The most rear depth p is noted.

Figure 3C:
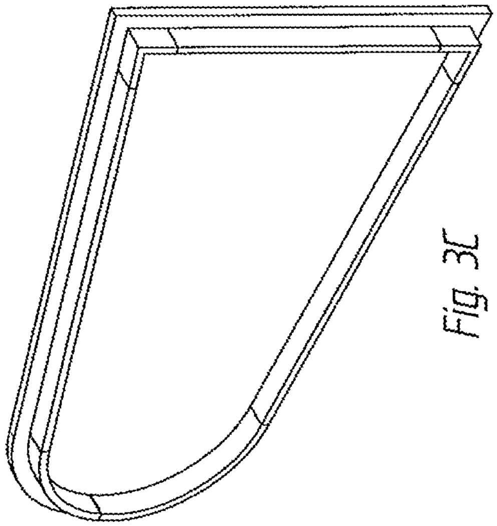
Figure 3B:
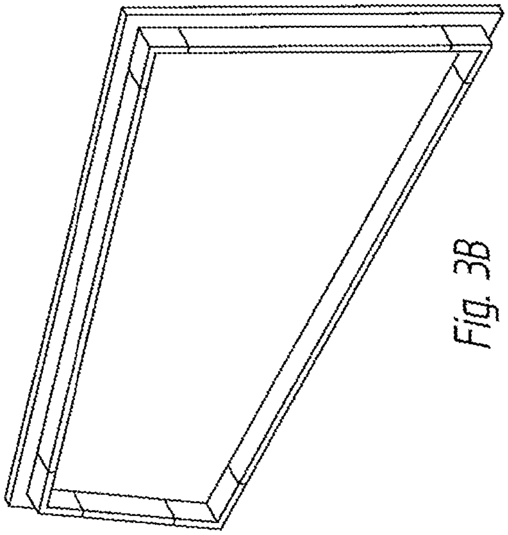
Figure 3A:
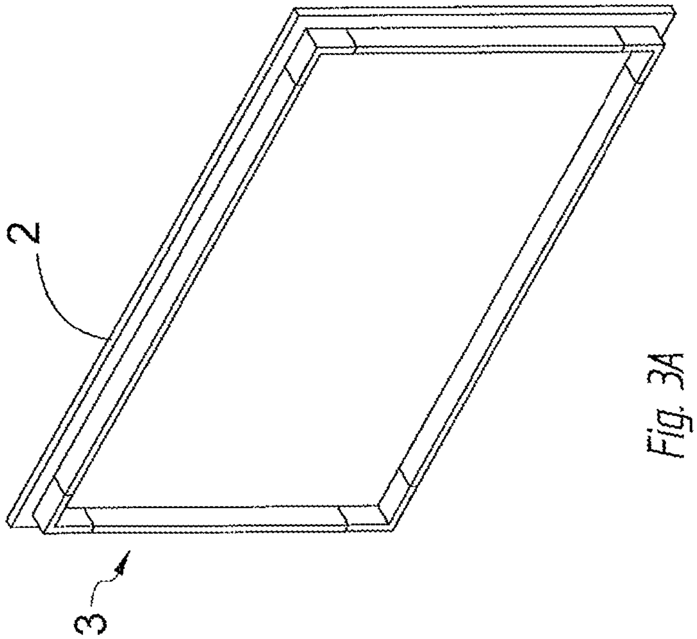

FIG. 3A shows the preferred composition of the spacer frame 3 having large sizes, for the rectangular glass plate 2, because it is modular in the machine due to the application thereof to the glass plate 2, 2', 2M, 2'*m*, etc., the spacer frame 3 having large sizes comprising four bent spacer profile elements positioned at the corners and straight spacer profile complementary sections forming each side, possibly more than four should the commercial length be less than the one of the stretch or should it become necessary not to scrap profile residue involved; the unions between such elements being implemented by means of straight inner inserts.

FIGS. 3B, 3C show circumstances with shapes of the glass plate 2 other than rectangular.

Figure 4:
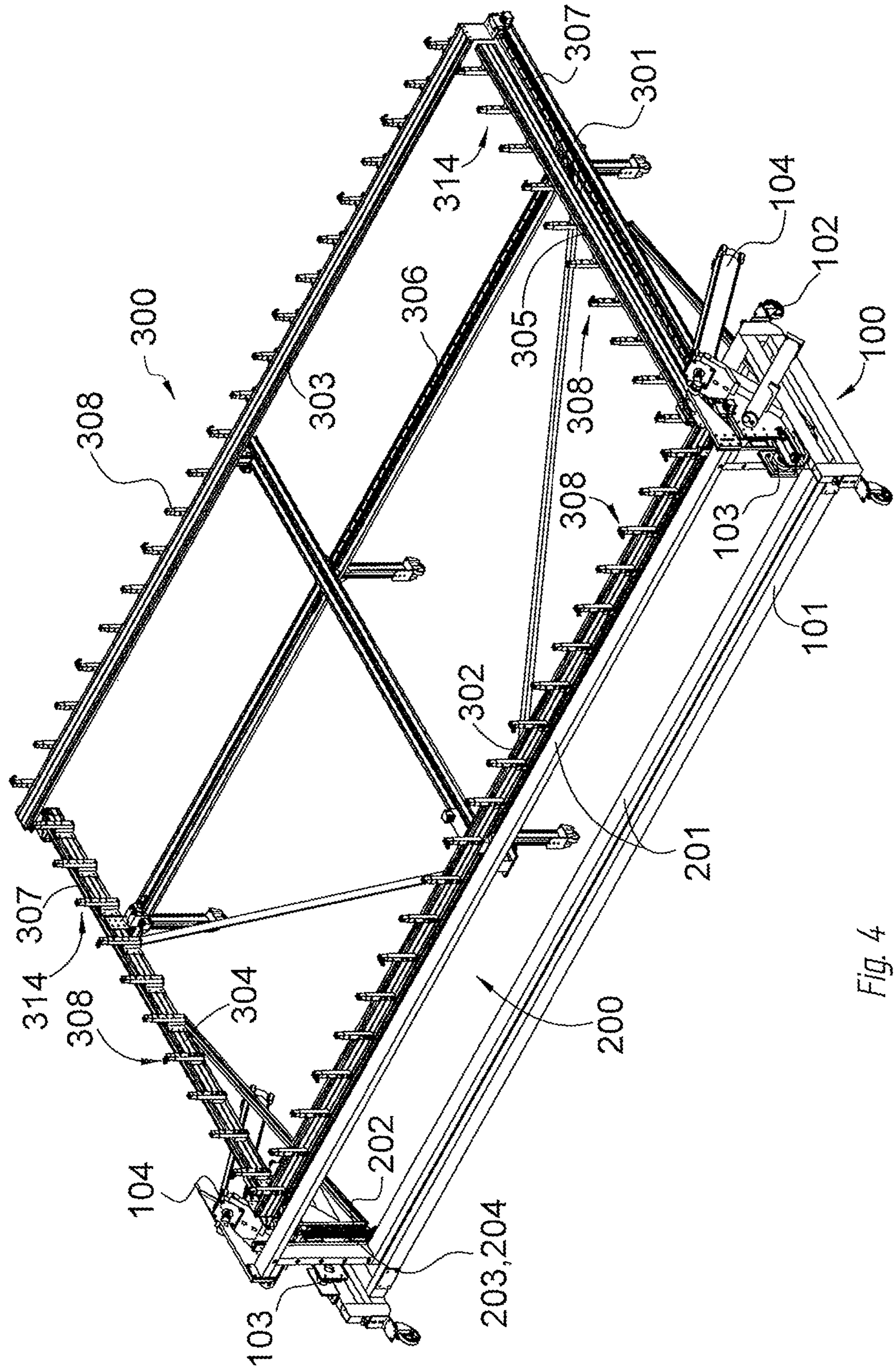
Figure 7:
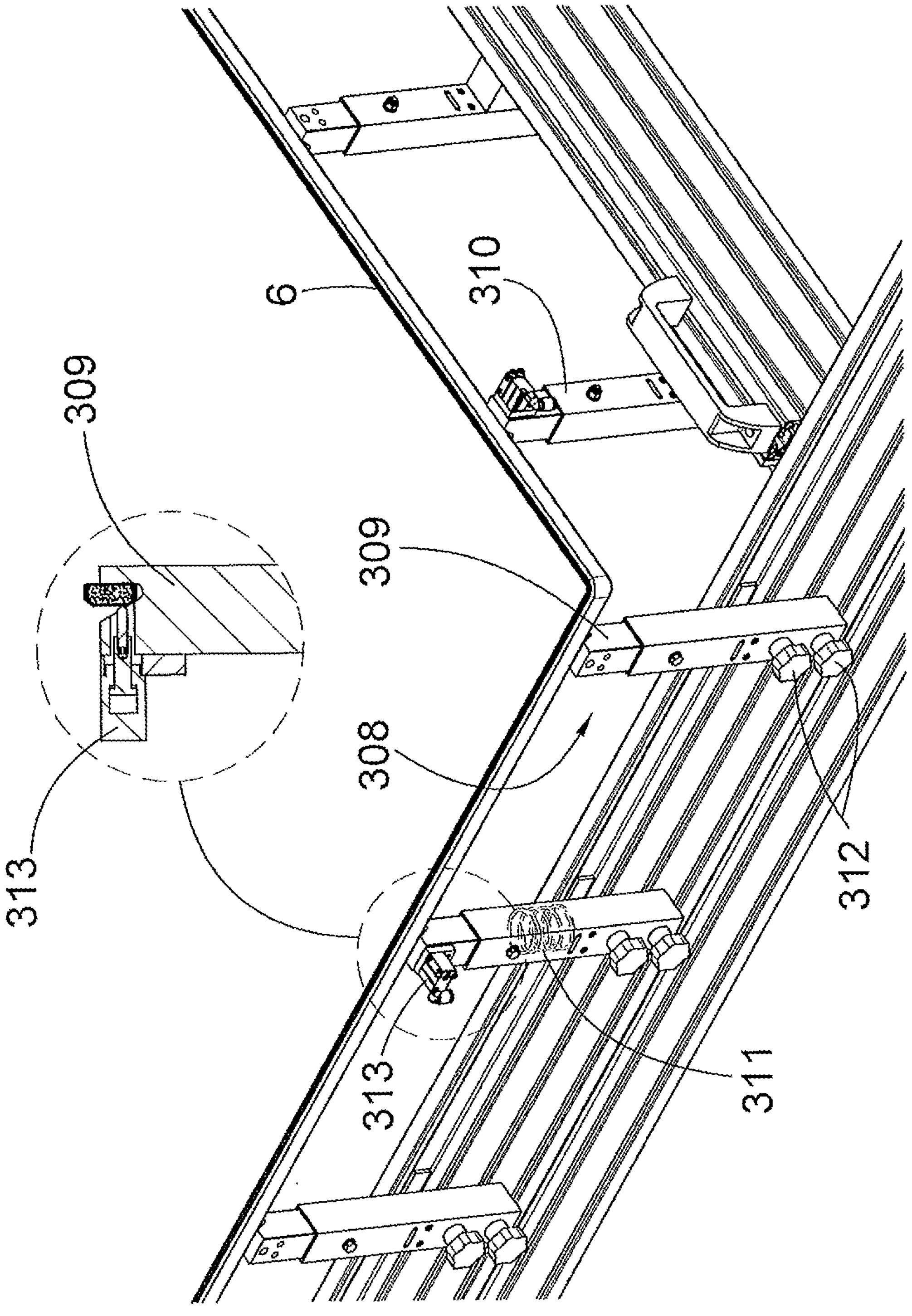

FIG. 4 shows the device in the horizontal position thereof, corresponding to the one used most easily to manufacture the spacer frame because it is the most ergonomic, stablest due to the spacer frame and the components (profiles and any accessories) thereof, and the safest for the operators. The following is shown:

- the 100 series base structure assembly, comprising the base structure 101, provided with wheels 102 and hinges 103 about which axis the remaining part of the device is caused to rotate, for example by two pneumatic cylinders 104, to reach the position slightly past the vertical plane, i.e. joined, with regard to the parallelism, with conveyor 900 of the insulating glass 1 manufacturing line;
- the 200 series intermediate rotating assembly, mainly formed by the rotating framework 201, pneumatic translating cylinders 202, the linear guides 203 and skids 204.
- the 300 series upper translating structure assembly, also called template when there is a need to refer to the function thereof, comprising: the upper framework 301, and of the reference bars 302, 303, 304, 305, the bars 303 and 305 being movable parallel to themselves along the guides 307 and 306, respectively, and shown in the drawing in the respective extensions corresponding to the maximum size of the modular rectangular frame, the bars 302 and 304 which are adjustable parallel to themselves according to depth p, and completed by other components discussed in detail in the description and in FIG. 7.

Figure 5:
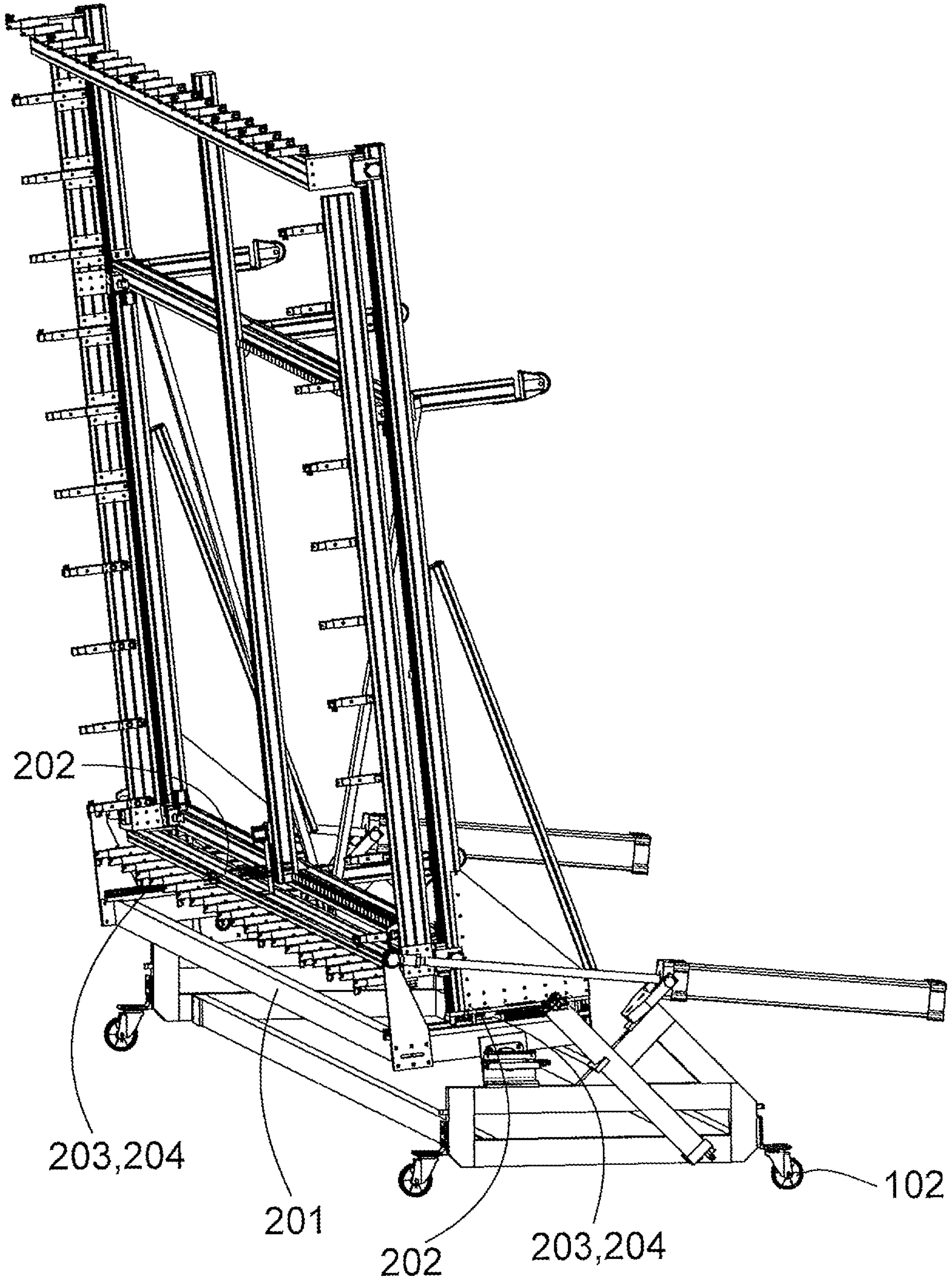

FIG. 5 shows the device of FIG. 4, in the joined position thereof, with regard to the parallelism, with conveyor 900 of the insulating glass manufacturing line.

Figure 6:
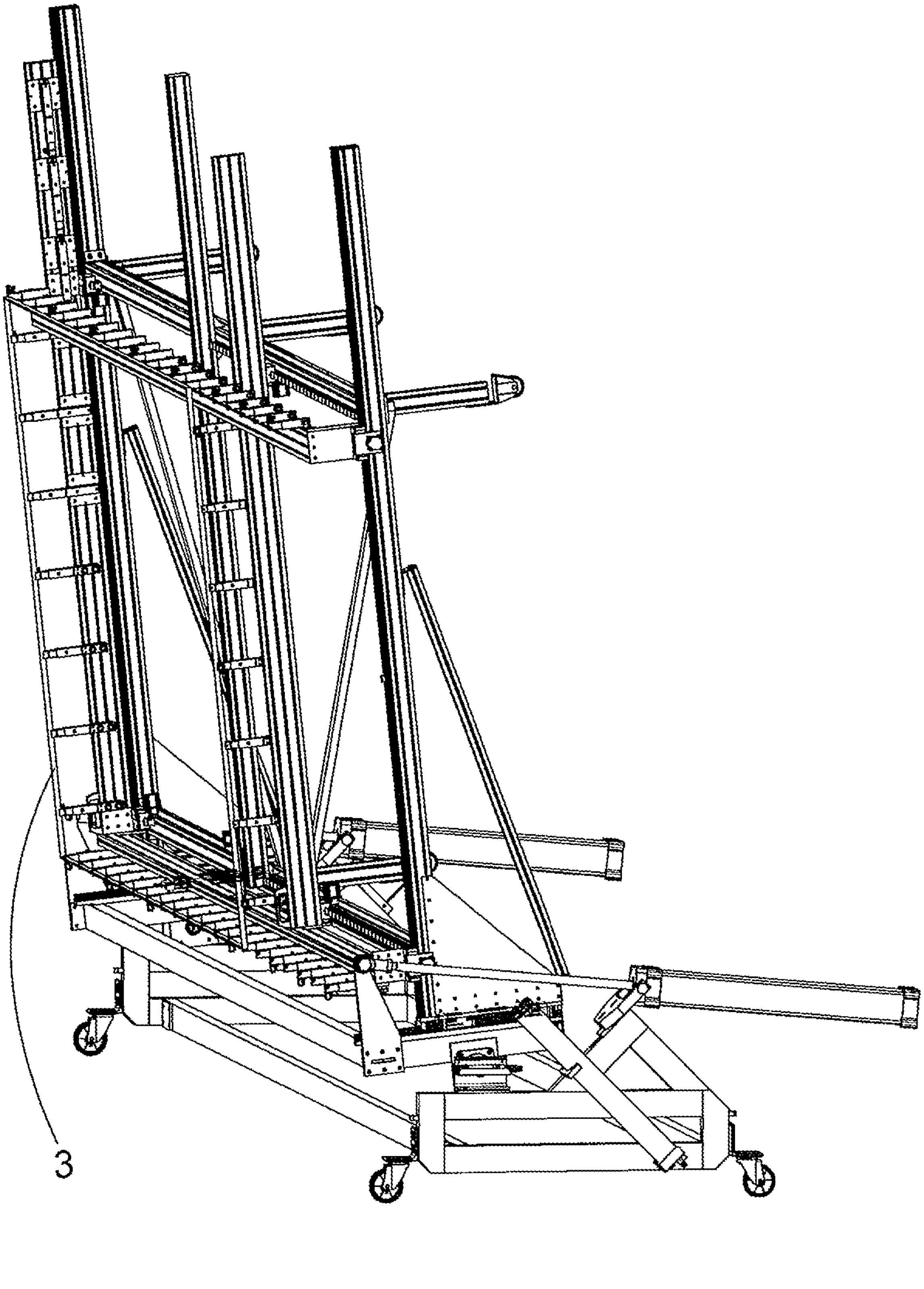

FIG. 6 shows the device, in the position in FIG. 5, bearing a finished spacer frame 3 having intermediate sizes in the range of minimum sizes-maximum sizes, positioned in the alignment and constraint housings.

FIG. 7 shows the device in the position in FIG. 4, noting the details of the alignment 309 and constraint 313 housings of a portion of the spacer frame comprising both an angular stretch and a stretch of side in assembly step; the presence of the primary sealant 6 is apparent. The components of the supports of the type 308 are shown, such as: support housings 309, guide 310, spring 311, fastening pawls 312, pneumatic constraint cylinders 313.

Figure 8:
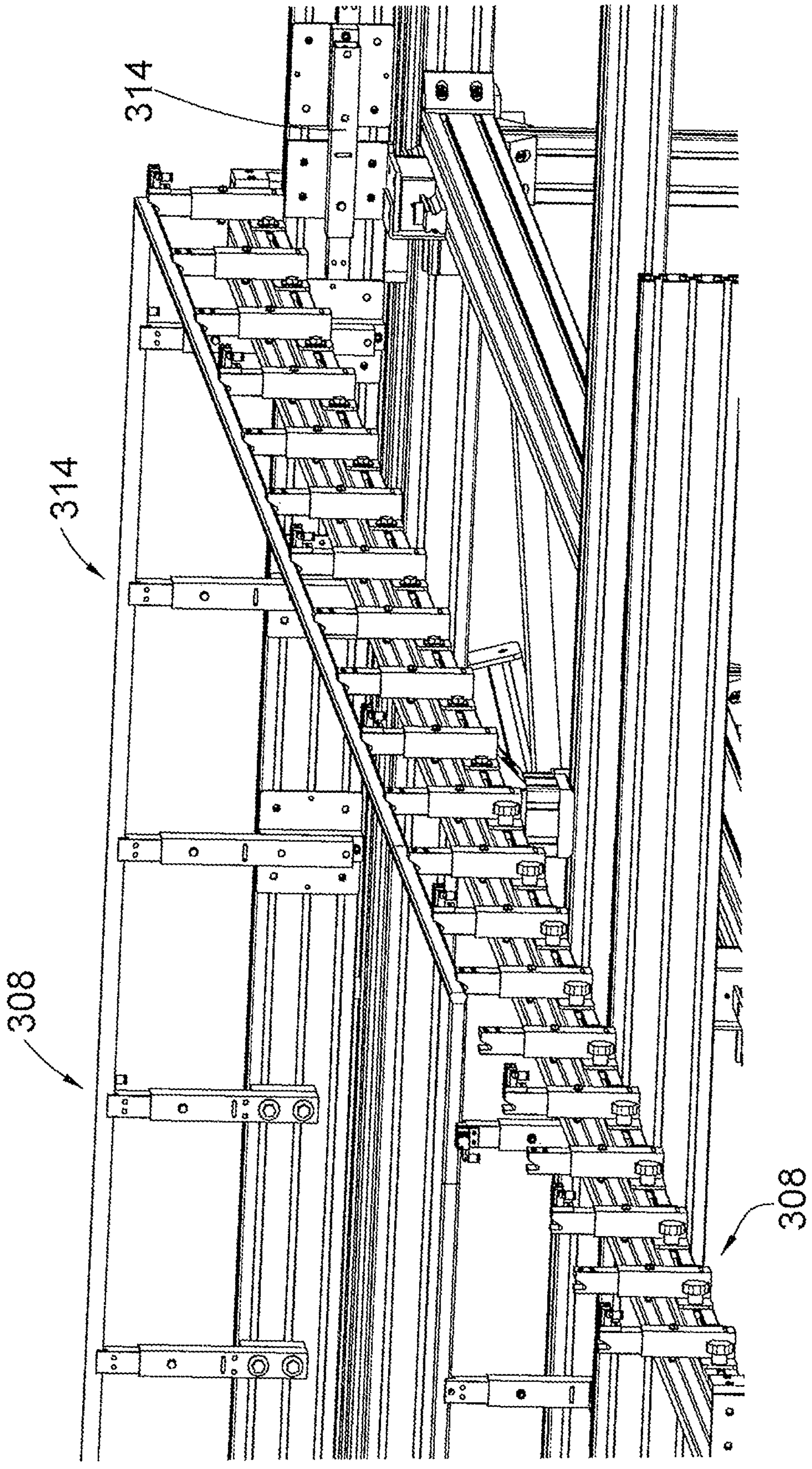

FIG. 8 shows the details of the supports of the types: 308 fixed in the volume of the frame having minimum size range, or sliding and lockable with pawls 312 in the complementary range; 314 retractable by rotation in the size variability range in order to free the area corresponding to the position of the corners of the frame. The fixed type allows the longitudinal adjustment by means of pawls 312 for the same reason to free the area corresponding to the position of the corners of the frame.

Figure 9:
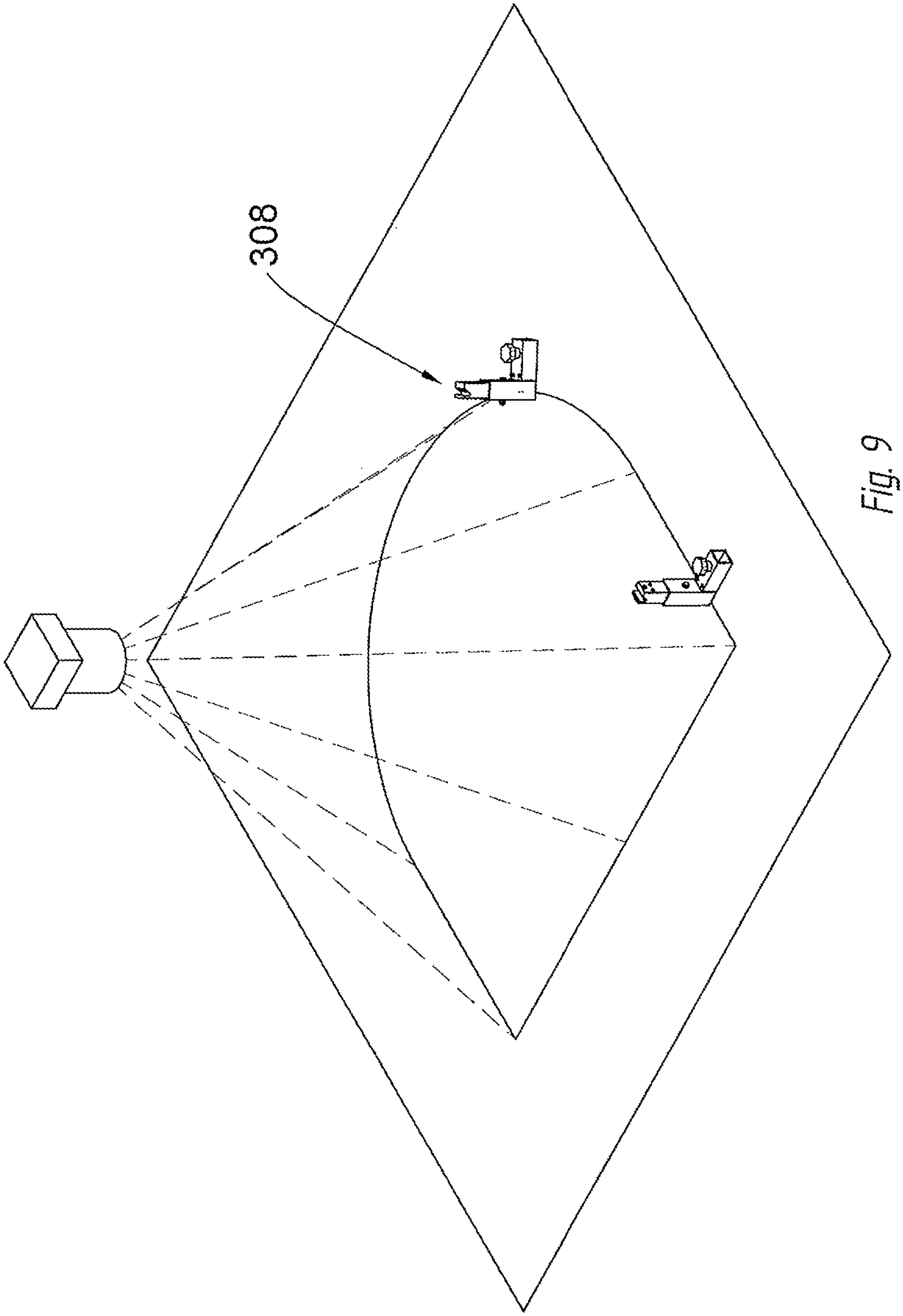

FIG. 9 shows a solution for also managing the non-rectangular spacer frames, such as, for example those shaped with all straight sides and those shaped with some straight sides and at least a part of curvilinear sides, a solution, for example achieved through a projector.

Figure 10:
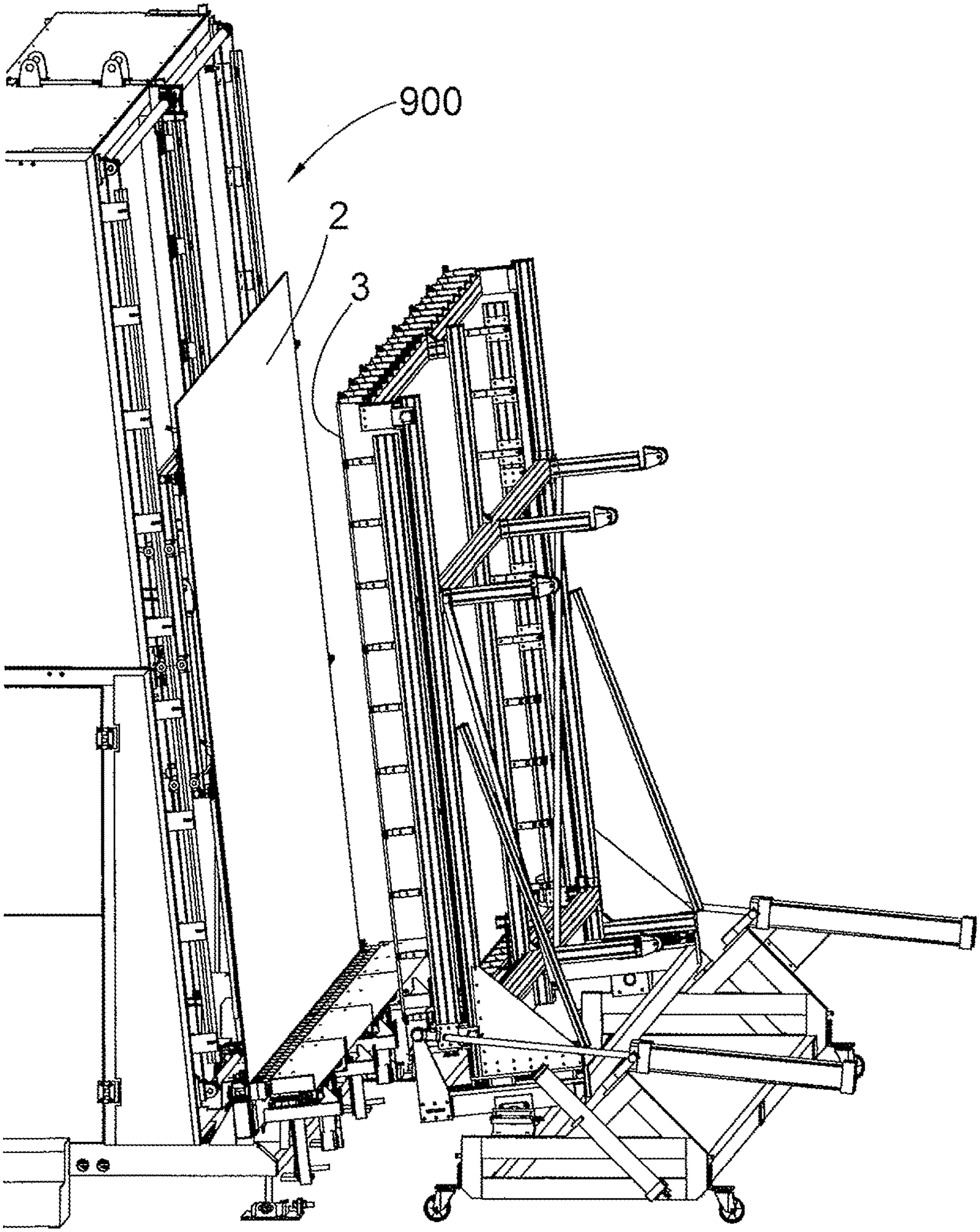

FIG. 10 shows the interfacing of device 1000 with conveyor 900 of the insulating glass manufacturing line in the slightly tilted position with respect to the vertical plane, i.e. of parallelism with respect to the plane of conveyor 900.

Figure 11:
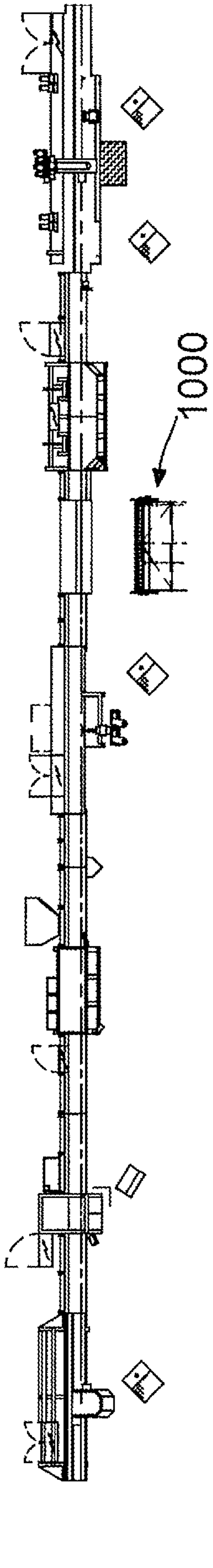

FIG. 11 shows the position of the device with respect to the overall insulating glass production line, in the horizontal position related to the prefabricating steps of the spacer frame (dashed depiction) and in the position shown in FIG. 10 related to the application steps of the spacer frame (depiction with solid line).

DESCRIPTION OF PREFERRED EMBODIMENTS

The following is the detailed description of an embodiment of the invention, mainly claiming a method and secondly claiming a device.

Both the method and the device disclose the solution of manufacturing, including filling with hygroscopic material 4 and coating the sides with primary sealant 6, and of applying the large spacer frame 3 while avoiding the movement thereof unless under constraint conditions, aligned and withheld, with a rigid structure, which for reasons of brevity is called template, moved either manually or through servomechanisms and automatisms or semi-automatisms so as to compensate for the deformability thereof, and also of obtaining a functional positioning on the glass plate 2 for the purposes of the validity of the peripheral joint (homogeneity of distance p between the extrados of the spacer frame 3 and the margin of the glass plate 2) and the resulting appearance (alignment of the intrados of the spacer frame 3 with the frame; alignment of the intradoses of the frames 3, 3', etc. in the case of multi-chamber insulating glass), or of a compromise between such needs.

Summarizing, the method is implemented, in the device mainly shown in FIGS. 4 to 8 and using the known art, which can be schematized in the following steps, herein described for the prevailing case of rectangular spacer frame 3:

- cutting modular profile elements from spacer profile bar, according to a layout correlated with shape and sizes of the finished spacer frame which is required for the insulating glass 1;
- bending the profile elements forming the four corners, as shown in FIGS. 3A to 3C; the corners may alternatively be obtained by means of known angular inserts, as shown in FIG. 7;

- filling the hollow parts of the profile elements with hygroscopic material 4 (moreover, in connection with the innovative process herein detailed, granules with sizes 0.8-1.3 mm may be used, with great advantages in terms of less cost and elimination of the dust, rather than 0.5-0.8 mm, which is the circumstance of the current technique of filling the already formed, and therefore closed, spacer frame 3 through openings having small diameter);
- plugging the ends of the profile elements with soft inserts;
- coating with the primary sealant 6;

such steps also possibly being carried out with different sequence, according to the following specific steps of the innovative method being claimed, herein described again for the simpler case of rectangular spacer frame 3;

- adjusting the lower horizontal 302 and vertical 304 head sliding bars parallel to themselves;
- positioning the upper horizontal 303 and tail vertical 305 sliding bars parallel to themselves according to the end sizes of the spacer frame 1;
- offsetting the references 308 of template 300, which might interfere with the corners of the spacer frame 3, by manually maneuvering the pawls 312;
- rotating the references 314 of template 300, which might interfere with the corners of the spacer frame 3, by manually maneuvering the prepared mechanism;
- housing the profile elements in the recesses of the support/alignment housings 309 upon the insertion of known longitudinal union inserts of the profile, such recesses forming, step-by-step and along the flat face thereof, the complete peripheral reference for the intrados of the spacer frame 3;
- locking, with implemented push, step-by-step, against the extrados of the profile elements towards the flat face of the recesses of the end supports 309 (FIG. 7), by means of the pushers actuated by the pneumatic cylinders 313;
- moving the system formed by: 100 series base structure, 200 series intermediate rotating structure, 300 series upper structure (template) translating towards the insulating glass production line 1 under condition of horizontal position of the spacer frame 3;
- constraining the base structure 100 with the alignment references with the spacer frame 3 laying station of the insulating glass 1 production line;
- rotating the intermediate structure 200 and subsequent upper structure 300 (template containing the spacer frame) by means of the actuators 104, from the horizontal position to the condition of parallelism with the plane of conveyor 900 of the spacer frame 3 laying station;
- translating the upper station 300 (template containing the spacer frame) towards the face of the glass plate 2 laying in the spacer frame 3 laying station by means of the pneumatic cylinders 202 up to achieving the thrust force of the support assembly 308 which is proportional to the development of the spacer frame 3, adapted to compress the primary sealant 6 in a workmanlike manner against the face of the glass plate 2;
- releasing the pneumatic pushers 313;
- repositioning translation into the resting condition of the upper structure 300 by means of the pneumatic cylinders 202;
- rotating the intermediate structure 200 and subsequent upper structure 300 up to the horizontal position by means of the actuators 104;
- repositioning the systems comprising: 100 series base structure, 200 series intermediate rotating structure, series 300 translating upper structure, in the manufacturing area of the spacer frame 3.

While the steps concerning manufacturing the spacer frame 3 are the optimal solution in the manual method both due to the natural flexibility of the profiles and to the composition of the additional materials such as the hygroscopic material 4 formed by granules having sizes of 0.8-1.3 mm and such as the thermoplastic and stick primary sealant 6 and accessories, served by aids such as the nozzles for introducing the hygroscopic material 4, the machine for the controlled extrusion of the primary sealant 6 on the sides of the profile sections, and the machine for bending the angle sections, from the moment the spacer frame 3 was completely formed and placed on the supports 308, 314, the steps concerning the above-described innovative process may be implemented by means of an automated method, naturally as can be the positioning of the bars 302, 303, 304, 305 and the supports 308, 314 of template 300.

Returning to the device, it also contains elements to be detailed with reference to the drawings and also some to be protected in terms of industrial property.

Such elements are the following.

Positioning on different planes of the lower 302 and upper 303 bars with respect to the head 304 and tail 305 bar to allow the crossing thereof.

Disappearance of the supports 314.

Adjustment, greater than depth p, of bar 304 for making insulating glass which is offset on the vertical (FIGS. 1C, 1D).

Adjustment, greater than depth p, of bar 302 for making insulating glass which is offset on the horizontal (FIGS. 1C, 1D).

INDUSTRIAL APPLICATION

It is to be noted that over the last decade, there has been a progressive extension of the sizes of insulating glass in the structural and architectural applications, from the so-called long windows (in the direction of the production line) of 4 or 5 m already at the top in 2000, to the Jumbo lengths of 6 m, to the Superjumbo lengths of 9 or 12 or 15 or even 18 m. One only needs to think of the megastores started by Apple which have led the trend in shopping malls or in slender structures of skyscrapers, or in architectural challenges. However, the problem of manufacturing, moving and applying the spacer frame 3 of the rigid type ("conventional" solution conventionally preferred and employed in the structural works rather than the "evolved" types) has not gone hand in hand when the sizes thereof exceed those manageable by the arms of one or two operators. Certainly, the increased cost in the prior art of the Jumbo or Superjumbo insulating glass 1, because it is formed by glass plates which are special and have increased thickness such as the laminated or shielded or tempered ones or those provided with nano-coating of the low emissivity or selective type and in the execution also of dual or triple chamber, has also resulted in the absorption of the costs resulting from the consistent manual skill, manufacturing operations, movement and application of the rigid frames; it goes without saying that any relative innovative solution which results in the reduction of costs and other advantages already detailed in the description is an added value to the insulating glass 1 product.

The insertion of the present invention in the insulating glass 1 production line is shown in FIG. 11 (plan view of a solution in which the working direction is from left to right) as an apparent guarantee of the certain success in the industrial application, despite the now consolidated but ever-evolving diffusion of such lines.

In addition, the device the object of the present invention may be easily implemented in existing lines because by performing an initial and collateral step of the manufacturing process of the insulating glass 1, i.e. manufacturing the spacer frame 3, such a device is to be frontally interfaced without the need to modify either the sequence or the volumes of the machines forming the line.

The invention claimed is:

1. A device for manufacturing a spacer frame and applying it to a glass plate to form an insulating glass, comprising:

a translating base structure;

an intermediate rotating structure connected to the translating base structure by hinges;

an actuator disposed between the translating base structure and the intermediate rotating structure, operable to rotate the intermediate rotating structure about the hinges;

a template connected to the intermediate rotating structure, the template including supports, configured to contact the frame at a plurality of locations defining a plane, and linear guides; and a pneumatic translating cylinder disposed between the template and the intermediate rotating structure operative to move the template in a direction orthogonal to the plane, wherein the supports releasably retain the spacer frame in the template;

wherein the intermediate rotating structure is operable to position the template parallel to a plane of a conveyor on which a glass plate is disposed; and wherein the pneumatic translating cylinder, when the template is parallel to the plane of the conveyor, is operable to translate the template in the orthogonal direction into engagement with the glass plate.

2. The device according to claim 1, wherein said template comprises:

a lower bar adjustable and lockable parallel to itself, an upper bar translating orthogonally to a longitudinal development and lockable, a head bar adjustable and lockable parallel to itself;

a tail bar translating orthogonally with respect to a longitudinal development and lockable parallel to itself.

3. The device according to claim 2, wherein the lower and upper bars are located on a plane offset from a plane of the head and tail bars to allow crossing of the relative movements.

4. The device according to claim 2, wherein at least one of said lower, upper, head and tail bars bears elements suitable for constituting a reference for the composition of the spacer frame and a constraint for holding the spacer frame.

5. The device according to claim 4, wherein said elements bear supports comprising a housing and a guide.

6. The device according to claim 5, wherein the housing is shaped so as to constitute, in correspondence with a flat face thereof, a zero reference for an intrados of the spacer frame, and in correspondence with a face opposite to the flat face, a contrast wedge for an extrados of the spacer frame.

7. The device according to claim 5, wherein said supports are implemented for moving or retracting through automatic kinematic mechanisms.

8. The device according to claim 2, wherein the lower, upper, head and tail bars are moved and positioned each with its own feedback actuator.

9. The device according to claim 1, wherein each one of a translation of the base structure to and from an insulating glass production line, a rotation of the intermediate rotating structure, and a translation of the template orthogonally to the plane towards and from the conveyor, is actuated by its own feedback actuator.

10. The device according to claim 9, wherein each feedback actuator is governed by a programmable logic controller for which inputs are constituted by feedback of positions of elements and outputs are constituted by signals towards power and control drives of the actuators.

11. A method for manufacturing an insulating glass provided with at least one glass plate and a spacer frame, comprising manufacture of the spacer frame and application of said spacer frame to the at least one glass plate, wherein the manufacture of the spacer frame comprises the steps of:

providing the device of claim 1, laying components for making up the spacer frame on the template, joining the components so as to obtain the spacer frame and locking the spacer frame on the template, and wherein the application of said spacer frame to the at least one glass plate comprises:

transfer of the spacer frame and template at a station of an insulating glass production line;

application of said spacer frame and template to the at least one glass plate, and release and removal of the template from the spacer frame.

12. The method according to claim 11, wherein during the laying step, on housings of the template, said components are pre-loaded-with hygroscopic material and/or pre-coated with primary sealant.

13. The method according to claim 11, wherein the application of said spacer frame to the at least one glass plate comprises the steps of:

alignment and constraint of the spacer frame and template with a laying station;

rotation of the spacer frame and template until reaching parallelism with a conveyor of the insulating glass production line;

displacement of the spacer frame and template towards the at least one glass plate so as to assemble the spacer frame to the at least one glass plate.

14. The method according to claim 13, wherein said displacement of the spacer frame and template provides for the implementation of a thrust force proportional to a total length of the spacer frame.

15. The method according to claim 11 wherein, following the assembly of the spacer frame on the glass plate, the following steps are performed: the spacer frame is released from the template; the template is withdrawn; the template is rotated up to a horizontal position; the template is removed from the insulating glass production line to a rest position suitable for application of a subsequent spacer frame.

16. The method according to claim 11, wherein joining the components on the template comprises the steps of:

adjustment of the template and relative locking, in a horizontal position, according to the size and shape of the spacer frame;

laying the components of the spacer frame, pre-loaded with hygroscopic material and/or pre-coated with primary sealant, on housings of the template;

joining the components and locking the spacer frame on the template.

17. The method according to claim 11, wherein the manufacture of the spacer frame is carried out manually, while the application of the spacer frame to the at least one glass plate is performed automatically.

18. The method according to claim 11, wherein the steps of manufacturing the spacer frame and applying said spacer frame to the at least one glass plate are all carried out through the same device and/or in correspondence with the same assembly station.

* * * * *